US012498717B2

United States Patent
Myles et al.

(10) Patent No.: US 12,498,717 B2
(45) Date of Patent: *Dec. 16, 2025

(54) RUGGEDIZED REMOTE CONTROL DISPLAY MANAGEMENT SYSTEM FOR HARSH AND SAFETY-CRITICAL ENVIRONMENTS

(71) Applicant: MASON ELECTRIC CO., Sylmar, CA (US)

(72) Inventors: Robert Jay Myles, Reseda, CA (US); Thomas C. Ruberto, Thousand Oaks, CA (US); Christopher L. Sommerville, Encino, CA (US); Harout Markarian, Porter Ranch, CA (US); Kelly P. Ambriz, Newbury Park, CA (US)

(73) Assignee: Mason Electric Co., Sylmar (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,414

(22) Filed: Sep. 5, 2023

(65) Prior Publication Data

US 2023/0409027 A1    Dec. 21, 2023

Related U.S. Application Data

(63) Continuation of application No. 17/119,574, filed on Dec. 11, 2020, now Pat. No. 11,747,802.

(Continued)

(51) Int. Cl.
  *G05D 1/00*  (2024.01)
  *G06F 3/04886*  (2022.01)
  *G06F 3/0489*  (2022.01)

(52) U.S. Cl.
  CPC ......... *G05D 1/0016* (2013.01); *G05D 1/0038* (2013.01); *G06F 3/04886* (2013.01); *G06F 3/0489* (2013.01); *G06F 2203/04803* (2013.01)

(58) Field of Classification Search
  CPC ............... G05D 1/0016; G05D 1/0038; G06F 3/04886; G06F 3/0489; G06F 2203/04803
  See application file for complete search history.

(56) References Cited

U.S. PATENT DOCUMENTS

| | | | |
|---|---|---|---|
| 2007/0055932 A1* | 3/2007 | Glein | G06F 9/451 715/209 |
| 2007/0067144 A1* | 3/2007 | Gaissmaier | G05B 19/41875 702/188 |

(Continued)

OTHER PUBLICATIONS

Daojing He et al., Communication Security of Unmanned Aerial Vehicles, ;Dec. 20, 2016, IEEE Wireless Communications , vol. 24, Issue: 4, pp. 137-139 (Year: 2016).*

(Continued)

*Primary Examiner* — Tam T Tran
(74) *Attorney, Agent, or Firm* — K&L GATES LLP

(57) ABSTRACT

A remote control display management system is disclosed. In an example, a remote control apparatus for unmanned systems includes a display screen for displaying graphic elements and a memory device storing a file for a graphic element and display parameters for displaying the graphic element. The apparatus also includes a processor and an application programming interface ("API"). The processor receives a command message from a host computer via the API. The command message includes at least one parameter value. The processor determines the command message is related to the graphic element stored in the memory device, and causes the graphic element to be displayed on the display screen by applying the at least one parameter value to the display parameters. The disclosed apparatus enables feature-rich high resolution graphics to be displayed on a remote control regardless of a connection speed with a host computer.

20 Claims, 11 Drawing Sheets

Related U.S. Application Data

(60) Provisional application No. 63/026,987, filed on May 19, 2020, provisional application No. 62/946,639, filed on Dec. 11, 2019.

(56) References Cited

U.S. PATENT DOCUMENTS

2007/0183436 A1* 8/2007 Hunter ................. H04L 67/025
                                                                  370/401
2021/0208602 A1* 7/2021 Yi ......................... G05D 1/042

OTHER PUBLICATIONS

Lars Baumgartner et al., Emergency Communication in Challenged Environments via Unmanned Ground and Aerial Vehicles, Oct. 1, 2017, IEEE Global Humanitarian Technology Conference, pp. 1-9 (Year: 2017).*

* cited by examiner

RUGGEDIZED REMOTE CONTROL DISPLAY MANAGEMENT SYSTEM FOR HARSH AND SAFETY-CRITICAL ENVIRONMENTS

PRIORITY CLAIM

This application is a continuation application of U.S. patent application Ser. No. 17/119,574, filed on Dec. 11, 2020, now U.S. Pat. Ser No. 11,747,802, which claims priority to and the benefit of U.S. Provisional Patent Application Ser. No. 62/946,639, filed on Dec. 11, 2019, and U.S. Provisional Patent Application Ser. No. 63/026,987, filed on May 19, 2020, the entire disclosures of which are hereby incorporated by reference.

BACKGROUND

Unmanned systems are typically controlled via one or more remote controls. Unmanned systems can include surveillance platforms, device arms, cranes, weapons, pipeline crawlers, aerial vehicles, water-based vehicles, land-based vehicles, and subterranean-based vehicles. An operator uses the one or more remote controls for providing commands to the unmanned system. In some instances, the remote controls are directly wired to an unmanned system. In other instances, the remote controls are wirelessly linked to an unmanned system. However, in most instances, especially for more sophisticated or larger systems (such as process controls or unmanned vehicles with long ranges) remote controls provide inputs to a host computer/server and a communication network, which in turn communicates with the unmanned system.

To control unmanned systems, operators manipulate controls (e.g., buttons, joysticks, touch sensors, etc.) on a panel of a remote control unit ("RCU"). The RCU communicates control information that is indicative of the operator manipulations of the controls to a host computer either directly (wired connection) or wirelessly. The host system interprets the control information, then relays appropriate commands to the unmanned system using a direct wired link, a wireless link, a satellite communications link, a radio-frequency ("RF") communications link, a cellular communications link, or combinations thereof. The unmanned system simultaneously transmits feedback information to the host computer. The feedback data may include location information, heading, altitude, ground speed, estimated range/battery life, weapon system status, and/or diagnostic information. The feedback data may take the form of video data, audio data, inferred data, or other sensed data that is indicative of an environment in view or in proximity to the remotely located unmanned system.

More recent RCUs have a graphical user interface, such as a display screen or touchscreen. For these RCUs, a host computer streams video data recorded by the unmanned system for display at the RCU. Alternatively, the host computer may transmit graphical representations for display, such as a map with the unmanned system's position, an attitude indicator, or other navigational/control aid that can be generated from the feedback data. The host computer may also provide graphics/icons that overlay the video data. The video data oftentimes provides a real-time or near real-time view from the unmanned system. An operator may use the video display for navigation and control to complete a desired mission, possibly in an augmented reality application. The video displays are especially useful when an unmanned system is no longer within sight of an operator. The close proximity of the screen to the controls on the RCU enables an operator to view the video data while providing control manipulations without having to shift their attention to a separate display monitor, keypad or joystick at a host computer or server.

A known issue with RCUs having video display capability is that a significant amount of data has to be transmitted from the host computer. This may include video data, graphical element files, icon files, video/audio files, menu files, etc. Based on the dynamic environment in which target systems operate, the data for the video display has to be transmitted to the RCU in real-time or near real-time to align with the current position of the unmanned system. In addition, the data is consistently updated. A delay as little as a half second could cause an unmanned system to miss a target, overshoot a waypoint, or crash. As such, communication links between host computers and RCUs have to provide for high speed data communication. However, known RCUs and/or host computers are oftentimes not configured for high speed data communication, or such communication links are not feasible given the operating conditions. As such, data transmission to support a video display on a RCU can be problematic over a lower speed data communication link, such as an RS-422/485 link or a serial data link.

SUMMARY

To overcome at least the above-issues with known RCUs, the present disclosure relates in general to a method, system, and apparatus configured to provide a display management system that is local to an RCU (e.g., a remote control). The display management system of the method, system, and apparatus includes at least one application program interface ("API") that is configured to produce sophisticated display screens with overlaid graphics and text while requiring only small amounts of information from a host computer. The example API(s) of the remote control disclosed herein enable developers to create and locally store graphic elements to a file system of an internal memory of the remote control. The graphic elements include image files, video files, icon files, graphic files, text display files, etc. The one or more APIs of the remote control may be commanded by a host computer to specify which file is to be displayed and the location on a display screen where the file is to be displayed (e.g. full-screen, picture-in-picture, tiled, etc.). The one or more APIs may also receive, from the host computer, data or information that is displayed in conjunction with the display element.

Locally storing graphic elements to the remote control disclosed herein reduces the amount of data that transmitted from a host computer. The reduction in data transmission enables the host computer and remote control to communicate over a slower data connection, such as an RS-422/485 connection or other serial interface, while still providing a feature-rich graphic display at the remote control. The storage of graphic elements at a remote control also enables customization and use of new graphic elements based on operator preferences or mission requirements, with minimal changes needed for a host computer.

In light of the disclosure set forth herein, and without limiting the disclosure in any way, in a first aspect of the present disclosure, which may be combined with any other aspect, or portion thereof, described herein a remote control apparatus for unmanned systems includes a display screen for displaying graphic elements and a memory device storing a file for a graphic element and display parameters for displaying the graphic element. The apparatus also includes a communication interface including an application programming interface ("API") communicatively coupled to the memory device that enable a host computer to (i) store the graphic element to the memory device, (ii) specify the display parameters and values for the display parameters, and (iii) cause the graphic element to be displayed. The apparatus further includes a processor configured to receive a command message from the host computer via the API. The command message includes at least one parameter value. The processor is also configured to determine the command message is related to the graphic element stored in the memory device, and cause the graphic element to be displayed on the display screen by applying the at least one parameter value to the display parameters.

In a second aspect of the present disclosure, which may be combined with any other aspect, or portion thereof, described herein, the processor is configured to receive a second command message from the host computer via the API. The second command message includes at least one location parameter value to change a display location of the graphic element. The processor is also configured to determine the command message is related to the graphic element stored in the memory device, and cause the graphic element to be displayed on the display screen at the specified display location by applying the at least one location parameter value to the display parameters.

In a third aspect of the present disclosure, which may be combined with any other aspect, or portion thereof, described herein, the processor is configured to receive a second command message from the host computer via the API. The second command message includes a data value for a specified display parameter for display within the graphic element. The processor is also configured to determine the command message is related to the graphic element stored in the memory device, and cause the graphic element to be displayed on the display screen with the data value using the specified display parameter.

In a fourth aspect of the present disclosure, which may be combined with any other aspect, or portion thereof, described herein, the processor is configured to receive a video stream from the host computer via the API, cause the video stream to be displayed on the display screen, and cause the graphic element to be overlaid on the display of the video stream.

In a fifth aspect of the present disclosure, which may be combined with any other aspect, or portion thereof, described herein, the video stream is received in the host computer from at least one camera of an unmanned system.

In a sixth aspect of the present disclosure, which may be combined with any other aspect, or portion thereof, described herein, the unmanned system includes at least one of an unmanned aerial vehicle ("UAV"), unmanned underwater vehicle ("UUV"), an unmanned surface vehicle ("USV"), or an unmanned ground vehicle ("UGV"), a remote camera system, a safety/first responder system, or industrial equipment.

In a seventh aspect of the present disclosure, which may be combined with any other aspect, or portion thereof, described herein, the communication interface is communicatively coupled to the host computer via at least one of a serial connection, an Ethernet connection, a Bluetooth® connection, a CAN bus connection, or a Zigbee® connection.

In an eighth aspect of the present disclosure, which may be combined with any other aspect, or portion thereof, described herein, the apparatus further includes a control interface including at least one of toggle controls, multi-axis hall-effect joystick controls, push buttons, or up/down push buttons.

In a ninth aspect of the present disclosure, which may be combined with any other aspect, or portion thereof, described herein, at least one display parameter of the display parameters includes an association with the control interface such that actuation of a button or a joystick of the control interface causes the processor to move or change a display characteristic of the graphic element.

In a tenth aspect of the present disclosure, which may be combined with any other aspect, or portion thereof, described herein, the display screen includes at least one of a touch screen or a multi-function display ("MFD"), and the touch screen is part of the control interface.

In an eleventh aspect of the present disclosure, which may be combined with any other aspect, or portion thereof, described herein, the graphic element provides for display of at least one of video related to an unmanned system in communication with the host computer, position, sensor, aspect, diagnostic, or status information related to an unmanned system in communication with the host computer, information related to related to an unmanned system that is determined by the host computer, a template, reticle, or wireframe for displaying information related to an unmanned system in communication with the host computer, or an icon or symbol related to operation of an unmanned system in communication with the host computer.

In a twelfth aspect of the present disclosure, which may be combined with any other aspect, or portion thereof, described herein, the processor is configured to receive the command message from the host computer at least one of before or during a mission performed by an unmanned system.

In a thirteenth aspect of the present disclosure, which may be combined with any other aspect, or portion thereof, described herein, the processor is configured to receive, via the API from the host computer, a screenshot request message, record an image of contents displayed by the display screen including the graphic element, and store the image to the memory device.

In a fourteenth aspect of the present disclosure, which may be combined with any other aspect, or portion thereof, described herein, a remote control method for unmanned systems includes receiving, in an application programming interface ("API") of a remote control, a command message from a host computer. The command message identifies a graphic element and includes at least one parameter value. The method also includes determining, via a processor of the remote control, that a memory device of the remote control includes a graphic element file corresponding to the graphic element specified in the command message. The method further includes applying, via the processor, the at least one parameter value to a corresponding display parameter of the graphic element file. The method additionally includes causing, via the processor, the graphic element to be displayed on a display screen of the remote control such that the graphic element is displayed as specified by the at least one parameter value.

In a fifteenth aspect of the present disclosure, which may be combined with any other aspect, or portion thereof, described herein, the method further includes receiving, in the API, before the command message, a graphic element message including the graphic element file from the host computer, and storing, via the processor, the graphic element to the memory device of the remote control.

In a sixteenth aspect of the present disclosure, which may be combined with any other aspect, or portion thereof, described herein, the method further includes receiving, via the API, a second command message from the host computer. The second command message includes at least one location parameter value to change a display location of the graphic element. The method also includes determining, via the processor, the second command message is related to the graphic element stored in the memory device, and causing, via the processor, the graphic element to be displayed on the display screen at the specified display location by applying the at least one location parameter value to the display parameter.

In a seventeenth aspect of the present disclosure, which may be combined with any other aspect, or portion thereof, described herein, the method further includes receiving, via the API, a second command message from the host computer. The second command message includes a data value for a specified display parameter for display within the graphic element. The method also includes determining, via the processor, the second command message is related to the graphic element stored in the memory device, and causing, via the processor, the graphic element to be displayed on the display screen with the data value using the specified display parameter.

In an eighteenth aspect of the present disclosure, which may be combined with any other aspect, or portion thereof, described herein, the method further includes receiving, via a control interface, a request message that is indicative of a request to view available video feeds of other remote controls, identifying, via the processor, available video feeds from other remote controls, causing, via the processor, a list of the identified video feeds to be displayed on the display screen, receiving, via the control interface, a selection of a video feed from the list, and causing, via the processor, the selected video feed to be displayed in addition to the graphic element.

In a nineteenth aspect of the present disclosure, which may be combined with any other aspect, or portion thereof, described herein, identifying the available data feeds includes transmitting, from the processor, a first request to a network, connected remote controls, or the host computer for a list or indication of the available video feeds, and causing the selected video feed to be displayed includes transmitting, from the processor, a second request to the network, the connected remote controls, or the host computer, for the selected video feed causing the selected video feed to be routed or transmitted to the API or the processor of the remote control.

In a twentieth aspect of the present disclosure, which may be combined with any other aspect, or portion thereof, described herein, the display parameter includes an association with a control interface of the remote control. The method further includes receiving, in the processor, a signal indicative of actuation of a button or a joystick of the control interface, determining, via the processor, the signal into a movement change or display change of the display parameter, updating, via the processor, the at least one parameter value using the determined movement change or display change, and causing, via the processor, the graphic element to be displayed on the display screen of the remote control such that the graphic element is displayed as specified by the updated at least one parameter value.

In a twenty-first aspect, any of the features, functionality and alternatives described in connection with any one or more of FIGS. 1 to 10 may be combined with any of the features, functionality and alternatives described in connection with any other of FIGS. 1 to 10.

In light of the present disclosure and the above aspects, it is therefore an advantage of the present disclosure to provide a remote control with locally stored graphic elements that are commanded for display via a remote computer.

It is another advantage of the present disclosure to reduce data transmission between a remote control for an unmanned vehicle and a remote computer by locally storing graphic elements at the remote control.

It is yet another advantage of the present disclosure to provide one or more interfaces at a remote control to enable locally stored graphic elements to be customized per operator preferences or applications.

It is yet a further advantage of the present disclosure to enable buttons or joysticks of a remote control to manipulate how graphic elements are displayed in real time or near-real time.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1A:
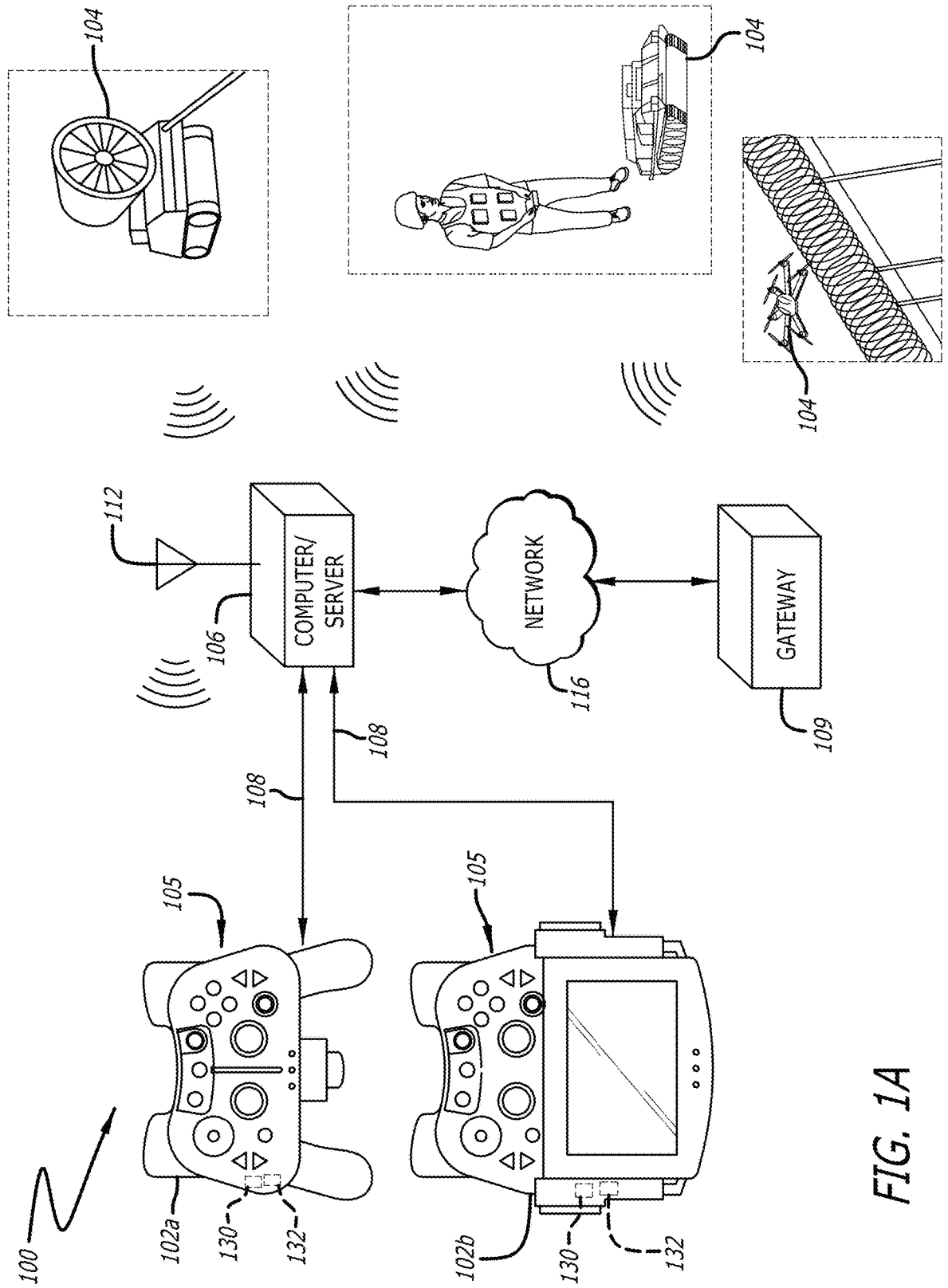
FIGS. 1A and 1B are diagrams of a target control system including an unmanned vehicle and a remote control, according to an example embodiment of the present disclosure.

The present disclosure relates in general to a method, system, and apparatus configured to provide a display management system for controlling a remotely located unmanned system. The method, system, and apparatus are configured for remote control units ("RCU"). As described herein, the method, system, and apparatus resolve the above-described issues of known RCUs by including at least one application program interface ("API") that is configured to produce sophisticated display screens with overlaid graphics and text while requiring only small amounts of information from a host computer. The example API(s) of the RCU disclosed herein enable developers to create and locally store (to a file system of an internal memory of a RCU) image files, video files, icon files, graphic files, text display files, etc. The one or more APIs may be commanded by a host computer to specify which file is to be displayed and the location on the display where the file is to be displayed (e.g. full-screen, picture-in-picture, tiled, etc.). Since only a file identifier and video placement information are transmitted instead of a complete file, less data is communicated between the host computer and the RCU, especially for high-resolution graphics and video. The API of the RCU disclosed herein are configured to store and access collections of screen elements as a group in response to a single command message. Further, the local storage of user-designed and developed graphic elements enables a developer to customize a look and feel of the video display on the RCU, rather than adhering to a rigid structure.

In contrast to the RCUs disclosed herein, known embedded controllers for remotely controlled systems often have no graphics capabilities of their own and small memory spaces. As a result, know RCUs receive files containing all the graphics for display from a host computer. Some higher resolution graphics may take longer to display over low speed connections between an RCU and host computer. In other instances, lower resolution graphics may be used to enable faster display at the RCU over a low speed data connection.

With the ability to host imagery locally, the capability to render graphical primitives, and a capability to display video streams with overlays in response to API commands sent over low-speed interfaces, the RCU architecture described herein serves as a graphical front-end for practically any embedded system. The implications for cost savings to modernize many fielded, legacy systems to include full graphical interfaces cannot be overstated. In many cases, only relatively small changes are needed for host computer software to implement the capability described herein. Moreover, replacement of legacy systems with high-speed, but low-cost embedded controllers with the graphics capability provided by the RCU described herein makes this an attractive, low overall cost option for implementing new systems or upgrading fielded systems.

Reference is made herein to graphic elements. As disclosed herein, a graphic element is a visual object that is displayed on a video display of a RCU. The graphic element may include video data as streamed from a target unmanned system, such as an unmanned vehicle. The graphic element may additionally include text and/or numerical values. The graphic element may further include icons, an attitude indicator, a reticle, a wireframe, etc. It should be appreciated that a graphic element may include any visual object that provides information that is indicative of a status/location/position of a target unmanned system, a current position of each joint of a 6-degree of freedom of a robot arm, a mission being performed by a target unmanned system, or any other information related to a target unmanned system.

The following sections describe embodiments pertaining to unmanned systems and vehicles. It should be appreciated that this is but one of many possible uses for the disclosed RCU. The RCUs may additionally be used for any target unmanned system, such as crane operation, remote camera surveillance (e.g., tripod, drone or vehicle based), and/or industrial equipment control such as mineral extraction. The RCUs disclosed herein may be provisioned for virtually any system that can be controlled remotely by an operator.

Reference is also made throughout to unmanned vehicles. As disclosed herein, an unmanned vehicle may include an unmanned aerial vehicle ("UAV") such as a drone, an unmanned underwater vehicle ("UUV"), an unmanned surface vehicle ("USV"), or an unmanned ground vehicle ("UGV"). The unmanned vehicles disclosed herein are not completely (or at all) autonomous. Instead, the unmanned vehicles disclosed herein require at least some control or instruction from one or more operators via one or more remote controls. The unmanned vehicles may be provisioned for surveillance/inspection/survey missions, rescue missions, firefighting missions, law enforcement missions, and/or military missions. For example, the unmanned vehicles disclosed herein may provide inspections for the oil and gas industry, conduct environmental surveys, or scout dangerous situations.

Unmanned System Embodiment

Figure 1B:
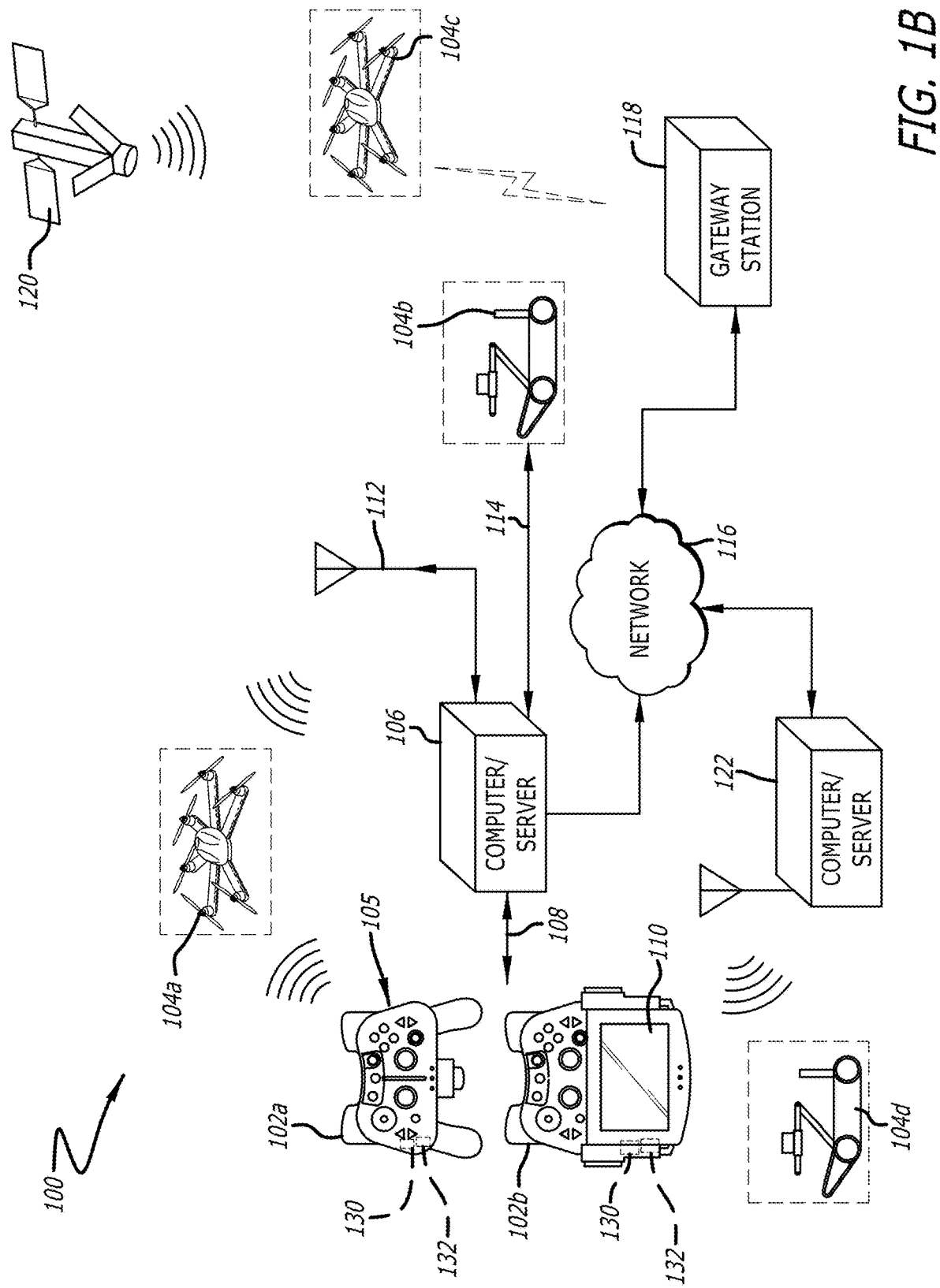

FIGS. 1A and 1B show diagrams of an example target control system 100 (e.g., an unmanned system), according to an example embodiment of the present disclosure. The example system 100 includes a remote control 102 (e.g., RCUs 102a and 102b) for controlling one or more target systems, such as illustrated unmanned vehicles 104. The remote control 102 is communicatively coupled to a host computer/server 106 via a wired or wireless connection 108. The example connection 108 may include, for example, an RS-422/485 connection or other serial interface, a human interface device ("HID") interface, an Ethernet interface, a local area network ("LAN") interface, a Universal Serial Bus ("USB") interface, a High-Definition Multimedia Interface ("HDMI") interface, a Controller Area Network ("CAN") bus interface, a Bluetooth® interface, a Zigbee® interface, etc.

FIG. 1A shows that that a remote control 102 may be interchangeably connected to the host computer 106. For example, the remote control 102a may be first connected to the host computer 106 for control of a target system 104 via line-of-sight. At a later time, a target system 104 may have to move out of visual sight of an operator. At this time, the operator may remove the remote control 102a and attach the remote control 102b to the host computer 106. In some embodiments, the remote control 102b transmits a handshake message or connection message that indicates the remote control 102b includes a display screen 110. In response, the host computer 106 is configured to transmit command messages for displaying graphic elements and/or video on the display screen, as described in more detail below.

In the illustrated example, the host computer 106 is configured to be in communication with the one or more unmanned vehicles 104 via a vehicle control interface. In an example, the remote control 102 receives commands from an operator via one or more button or switch 105 presses. The remote control 102 transmits signals or messages that are indicative of the commands to the host computer 106 via the connection 108. The host computer 106 converts the commands into one or more instruction messages that are formatted in a language/protocol of the unmanned vehicle 104. The host computer 106, using a specified communication link, transmits the instruction messages to the connected unmanned vehicle 104.

In addition to transmitting instructions, the host computer 106 is configured to receive feedback data from the unmanned vehicle 104. The data may include camera images, video images, audio, sensor data, diagnostic information (battery life, triggered fault codes, etc.), and aspect information (vehicle speed, heading, GPS coordinates, altitude, attitude, etc.). The host computer 106 is configured to process the feedback data for visual conveyance to an operator. For example, the host computer 106 may use GPS data for determining and showing a location of the unmanned vehicle 104 on a map. In another example, the host computer 106 may use aspect information for updating a virtual instrument panel or reticle with data values received from the unmanned vehicle 104. In yet another example, the host computer 106 may display a model or graphical representation of a current position/arrangement of a target system 104, such as a position of a crane boom, jib, and/or hook. The host computer 106 may also process video images or streams for rendering. In some examples, the host computer 106 includes a display interface for displaying at least some of the command instructions and processed feedback data. Such information may be useful to mission operators or monitors. As mentioned above, the host computer 106 is configured to transmit at least some of the information to the remote control 102 for display on a local display screen 110.

As shown in the illustrated example, there are a number of ways the host computer 106 may be in communication with the unmanned vehicle 104. In some examples, the host computer 106 may be directly communicatively coupled to an antenna 112. In these examples, the host computer 106 includes a transceiver for wireless communication with the unmanned vehicle 104a, as shown in FIG. 1B. Alternatively, the host computer 106 is connected via a wiring harness or single wire 114 to an unmanned vehicle 104b, also as shown in FIG. 1B. A hard wire 114 may be used in instances where the unmanned vehicle 104b is traveling through a location where wireless signals cannot propagate well, such as an indoor location or a submersible vehicle.

As shown in FIG. 1A, the host computer 106 is communicatively coupled to a gateway 109 via a network 116 (e.g., the Internet). The gateway 109 may include a command and control system from which at least some instructions for target systems 104 are provided. The command and control system enables remote operators to control a target system via a network connection to the host computer 106.

In yet another example, as shown in FIG. 1B, the host computer 106 is communicatively coupled to a gateway station 118 via the network 116. The gateway station 118 includes a satellite transceiver for communication with a satellite system 120. The satellite system 120 relays communications from the gateway station 118 to an unmanned vehicle 104c. Feedback data is transmitted from the unmanned vehicle 104c to the satellite system 120, and down to the gateway station 118, which formats the communications as Internet packets for transmission to the host computer 106. In this example, the gateway station 118 and satellite system 120 may be replaced with a cellular tower for cellular communications with an unmanned vehicle.

In yet other embodiments, the host computer 106 is communicatively coupled to another host computer 122, which includes a transceiver and antenna for wireless communication with an unmanned vehicle 104d. The host computer 106 may be connected to the host computer 122 via the network 116, which may include any cellular and/or wide area network. Further, in some instances, the remote control 102 includes a transceiver for direct wireless communication with an unmanned vehicle 104a, thereby bypassing and use of the host computer 106.

Generally, the host computers 106 are configured and operated by third-parties. The computers 106 include software for establishing and maintaining a communication link with an unmanned vehicle. The software is also configured to process feedback data from the unmanned vehicle. Oftentimes, the manufacturer of the remote control 102 is different from the manufacturer of the unmanned vehicle and/or operator of the computer 106. As such, the software on the host computer 106 includes a translator that converts commands from the remote control 102 into instructions for the unmanned vehicle 104. This configurability enables any type of remote control to be used for virtually any type of unmanned vehicle.

Currently, known host computers are configured to transmit all the data for display on a video display of a remote control. As discussed above, this is a significant amount of data that requires a fast data connection. Further, most known manufacturers of remote controls create their own graphic element package, which gives operators or unmanned vehicle operators no flexibility or creativity in being able to specify how certain information is to be displayed.

The example remote control 102 of FIGS. 1A and 1B includes a display management system 130 and a local memory 132. As disclosed herein, the display management system 130 includes APIs that enable developers to create their own graphic elements, which are then stored to the local memory 132. During use, the host computer 106 is configured to transmit API calls that identify the graphic element and its location for display on the display screen 110 of the remote control 102 instead of transmitting complete visual files. The API calls may also include the data for population into the graphic element. Such a configuration enables a third-party to customize the display screen 110 of the remote control 102 while reducing needed bandwidth with the host computer 106 during missions. This enables lower data connection types to be used between the remote control 102 and the host computer 106.

Remote Control Embodiment

Figure 2:
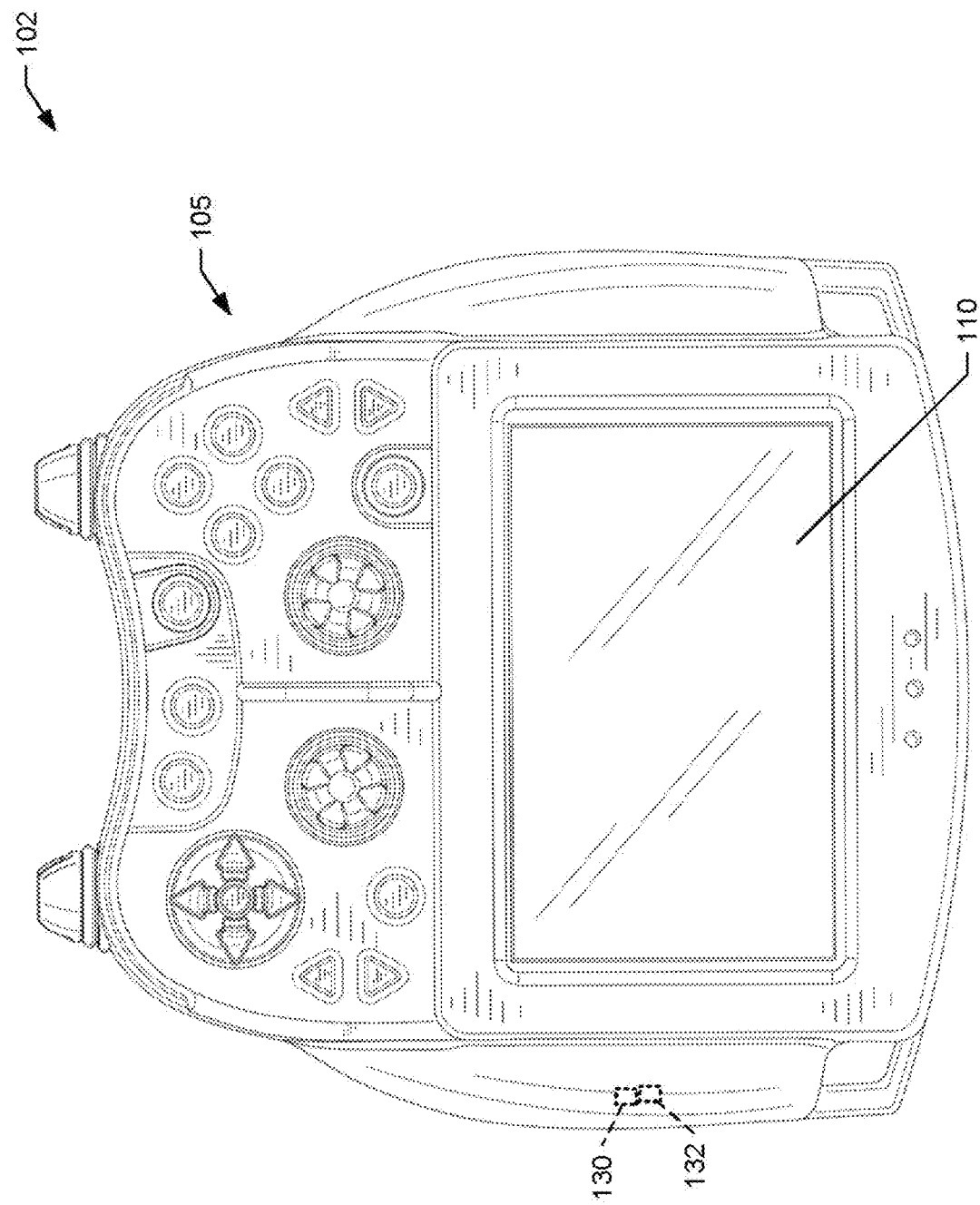
FIG. 2 is a diagram of the remote control of FIGS. 1A and 1, according to an example embodiment of the present disclosure.

FIG. 2 shows a diagram of the remote control 102 of FIGS. 1A and 1, according to an example embodiment of the present disclosure. A top half of the remote control 102 includes buttons and switches 105 (e.g., a control interface). These include toggle controls, multi-axis hall-effect joystick controls, push buttons, and up/down push buttons. It should be appreciated that the remote control 102 may include additional or fewer buttons. For example, the remote control 102 may include triggers and palm switches. The remote control 102 also includes a display screen 110, which may include a touch screen and/or a multi-function display ("MFD").

Figure 3:
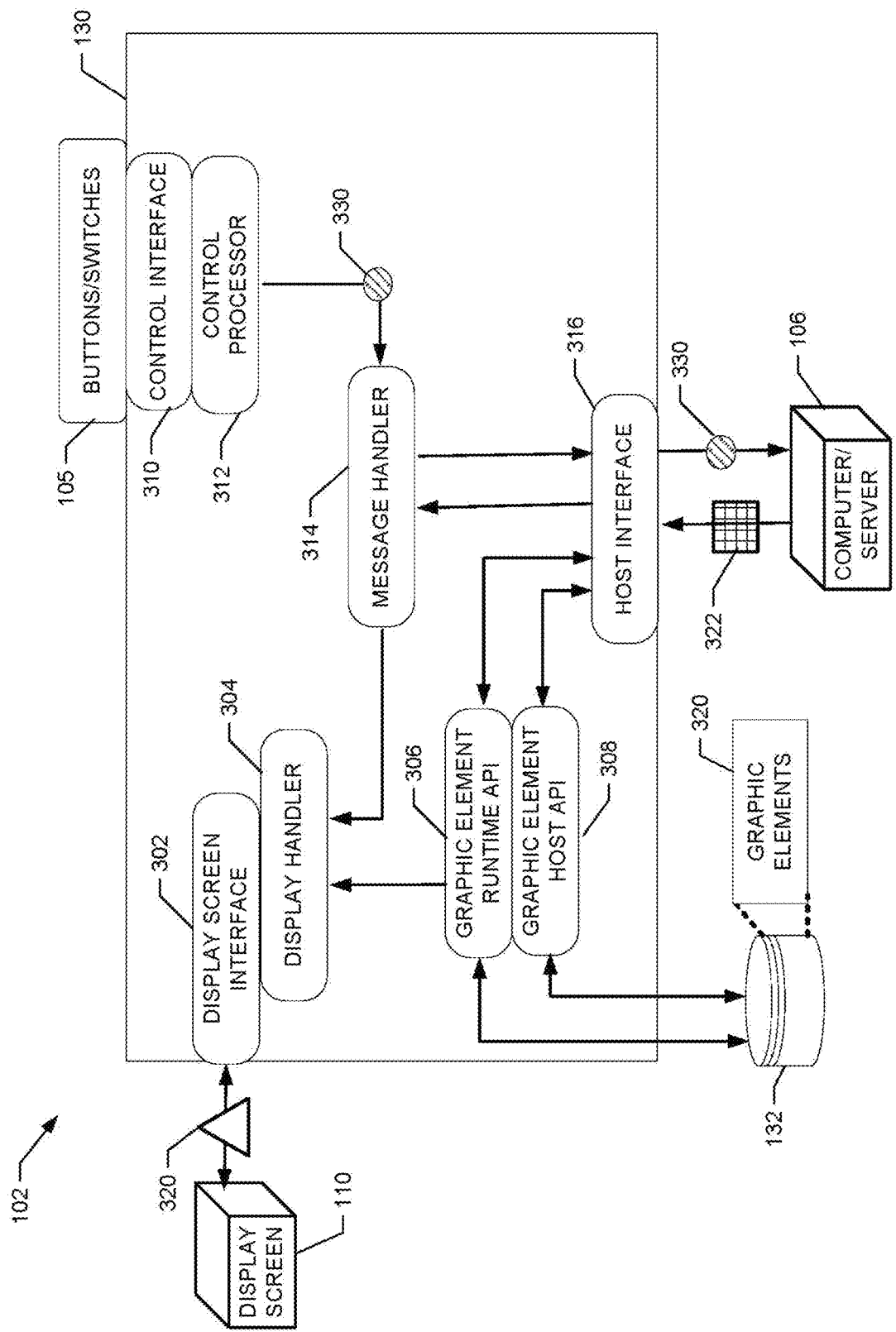
FIG. 3 is a diagram that is illustrative of operations performed by the remote control of FIGS. 1A, 1B, and 2, according to an example embodiment of the present disclosure.

The remote control 102 also includes a display management system 130, described in more detail in conjunction with FIG. 3. The display management system 130 includes one or more processors, microcontrollers, controllers, logic implementers, Application Specific Integrated Circuits ("ASICs") etc. that execute instructions (e.g., software) for transmitting commands from the switches 105 to the host computer 106 and processing data and messages from the host computer 106 for display on the display screen 110. As described herein, at least some graphic elements are stored to a memory device 132 of the remote control 102 to reduce the amount of data transmitted during control of an unmanned vehicle. The memory device 132 may include any volatile or non-volatile memory such as a flash memory, random-access memory ("RAM"), read-only memory ("ROM"), Electrically Erasable Programmable Read-Only Memory ("EEPROM"), etc.

FIG. 3 shows a diagram of the display management system 130 of the remote control 102 of FIGS. 1 and 2, according to an example embodiment of the present disclosure. The display management system 130 includes a display screen interface 302, a display handler 304, a graphic element runtime API 306, and a graphic element host API 308. FIG. 3 also shows that the display management system 130 includes a control interface 310, a control processor 312, a message handler 314, and a host interface 316. It should be appreciated that in other embodiments, the control interface 310, the control processor 312, the message handler 314, and the host interface 316 may be part of a control management system.

The components 302 to 316 of the remote control 102 are representative of hardware and/or software. For instance, one or more instructions may be stored to the memory device 132 that define operation of the components 302 to 316. Execution of the instructions by a processor of the remote control 102 causes the processor to perform the operations described herein. In some embodiments, the remote control 102 may also include a wireless transceiver for direct wireless communication with an unmanned vehicle.

The example host interface 316 is configured to communicate with the host computer 106 of FIGS. 1A and 1B. The host interface 316 may include one or more ports, and be configured with communication protocol(s) to provide for communication via, for example, an Ethernet connection, a LAN connection, a serial connection, a USB connection, a Bluetooth® connection, a Zigbee® connection, a CAN bus connection, etc. In some embodiments, the host interface 316 is assigned an address, such as a MAC address, an IP address, a controller address, etc.

The example host interface 316 is in communication with the graphic element runtime API 306 and the graphic element host API 308. The example host API 308 is configured to enable the host computer 106 to provide instructions for creating, editing, managing, or otherwise manipulating graphic elements for graphic primitives, scalable symbology such as reticles and indicators, video streams, bitmap screen elements, and/or text generation.

Each graphic element includes one or more fields to define a visual appearance. Some fields may also enable a position of the graphic element to be specified. The host computer 106 accesses the host interface 106 and transmits a message or other command to access the graphic element host API 308. In some instances, selection of the API 308 causes the API to display a directory of graphic elements 320 that are already stored to the memory device 132. An operator may select one of these graphic elements, which causes the host API 308 to load the already specified field values into the parameter fields for the graphic element. An operator may then edit or otherwise modify the values in the fields.

The host API 308 may also provide an option for an operator to create anew graphic element 320. In some instances, the host API 308 may provide a list of all possible fields for population or provide a subset of the possible fields based on the graphic element type selection. The fields may include a value to specify a visual parameter. In other instances, the fields may define a variable identifier for displaying data received from the host computer 106. For example, an operator may specify that an altitude value is to be populated into a certain field, defined by certain visual parameters, when an API call or message is received from the host computer 106 with the altitude value.

An example of fields provided by the host API 308 for a "Tool Bar" graphic element is provided below. The fields may be shown in a web form with the corresponding documentation.

```
message ToolBarParameter {
    oneof property {
        bool visible = 1;        // TRUE/FALSE = Show/Hide the tool bar
        float x = 2;             // Upper left screen corner position X
        float y = 3;             // Upper left screen corner position Y
        float width = 4;         // Background rectangle width in pixels
        float height = 5;        // Background rectangle height in pixels
        string options__ = 6 ;   // FileListParameter object
        uint32 iconsSpacing = 7; // Pixels between toolbar icons
        uint32 margins = 8;      // Pixels at either end of toolbar
        bool isVertical = 9;     // Toolbar on side of screen if TRUE
                                 // Otherwise, on top or bottom (per x, y)
        string backColor = 10;   // Background rectangle color
        int32 selected = 11;     // Number of icon currently selected
        string selectedColor = 12; // Icon background color when selected
        string selectedBorderColor = 13; // Icon border color when selected
        int32 selectedBorderWidth = 14; // Icon border width when selected
    }
}
```

The properties/parameters include a reference to separate icon files to enable the tool bar to include additional graphics. The operator stores to the memory device 132 the icon files. The operator may then fill in a list of the filenames for the icon files for one or more parameters of the "Tool Bar" graphic, as shown below:

```
message FileListParameters
    repeated FileListParameter properties = 2;
}
```

After the graphic element has been specified by the host computer 106, the operator passes or transmits the entered values to the host API 308, which creates and/or stores the parameters of the graphic element. In some embodiments, the host API 308 is configured to support Unicode Transformation Formation ("UTF-8") text for the development of multi-language menus and displays. At this point, the graphic element may be called or invoked through the graphic element runtime API 306 for display on the display screen 110.

To display a graphic element, the host computer 106 transmits a command message 322 to the host interface 316, which routes the command message 322 to the runtime API 306. The command message 322 includes an identification of the graphic element to display. The command may also include data values for display via the graphic elements, such as an altitude value. The command 322 may further include values to update one or more parameters of the graphic element. This enables, for example, a graphic element's display location or appearance to be changed in real-time. After receiving the command, the runtime API 306 is configured to search for, access, and retrieve the specified graphic element 320 from the memory device 132. The runtime API 306 may also populate one or more data fields with data and/or update display parameters. The runtime API 306 then transmits the graphic element 320 to the display handler 304, which renders the graphic element. The display handler 304 may combine the graphic element 320 with other graphic elements for display, such as video data, mission information, and/or other navigational aids in an overlay fashion. The interface 302 receives the rendered graphic element(s), converts them to video data, and causes them to be displayed on the display screen 110 of the remote control 102. The graphic element 320 may be displayed until a command is received from the host computer 106 to remove its display, or upon selection of a different menu item or screen type by an operator.

In some instances, the runtime API 306 enables an operator to define and display graphic primitives and/or text in real-time. This may include designators, reticles, and text windows. The runtime API 306 may be configured to enable a developer to define rectangles, circles (filled and wireframe), and lines, using a minimal amount of information. By providing an API command with attributes/parameters to indicate a screen location for displaying these elements, only single commands are needed to update the attribute information to relocate, resize, or recolor them. The APIs 306 and 308 may also provide for the storage and reference of font definition files for UTF-8 languages. A single command to the API 306 selects a font to use, where the API 306 interprets the UTF-8 codes to supply the specific text characters.

In some embodiments, an operator may store a video file, such as an .avi, .mp4, etc. to the memory device 132. The host computer 106 may send a single message to the API 308 that identifies the video file, causing the API 308 to access the video file from the memory device 132 and transmit it to the display handler 304 for display on the display screen 110 of the remote control 102. In some instances, the message may only identify the video file. In other instances, the message may specify a graphic element that the video is to be displayed with, such as a video user interface with playback controls. In yet other instances, the message may identify the video file and parameters for displaying the video file, such as a video screen size, location on the display screen 110, and/or border parameters. Again, it should be noted that the host computer 106 is completely relieved of processing the video during these presentations once it has instructed the remote control 102 to playback the video file.

In another example, the memory device 132 stores separate files for an icon that have four discrete appearance states. The memory device 132 may also store parameters for the files that define the conditions as to when the corresponding icon state is to be displayed. The separate files may be loaded into the memory device 132 simultaneously with a single command from the host computer 106, but with their visibility attributes reset to keep them from appearing on the display screen 110. Then, with the host computer 106 transmits a command to update only the visibility attribute based upon a given state, the API 308 causes the corresponding icon image to appear on the display screen 110. Since the images can be preloaded into the memory device 132, there is no latency incurred to pull the files from storage to expand into a video buffer. This capability can be used to simulate icon animation by rotating through a series of states by transmitting visibility update commands in rapid succession without the overhead of having to send the pixel information for each change to an icon image, which is especially important over low-speed interfaces.

In addition to providing for the display of graphic elements stored in the memory device 132 and/or feedback data from the host computer 106, the example management system 130 of the remote control 102 is configured to receive inputs from an operator in the form of manual manipulations of its control switches and transducers (e.g., joysticks). The remote control 102 includes a plurality of buttons and switches 105 that are configured to receive an operator's input. The buttons and/or switches 105 operate with a control interface 310 that transduces movement of the buttons and/or switches 105 into an analog and/or digital signal that is indicative of and/or proportional to the button/switch movement.

A control processor 312 is configured to receive and convert the signals from the control interface 310 into one or more messages 330. The message may include a value indicative of the button movement. The message 330 may also include an identifier of the button. The control processor 312 transmits the message(s) 330 to the message handler 314, which routes the message 330 for transmission to the host computer 106 via the host interface 316. The message handler 314 may convert the message 330 into a format or protocol that is compatible with the communication link with the host computer 330. For example, the message handler 314 may convert the message to a first protocol for an RS-422 communication link, a second protocol for an Ethernet communication link, and a third protocol for a CAN bus, Bluetooth®, or Zigbee® communication link. The example host computer 106 processes the message 330 for transmission to the unmanned vehicle 104.

Figure 4:
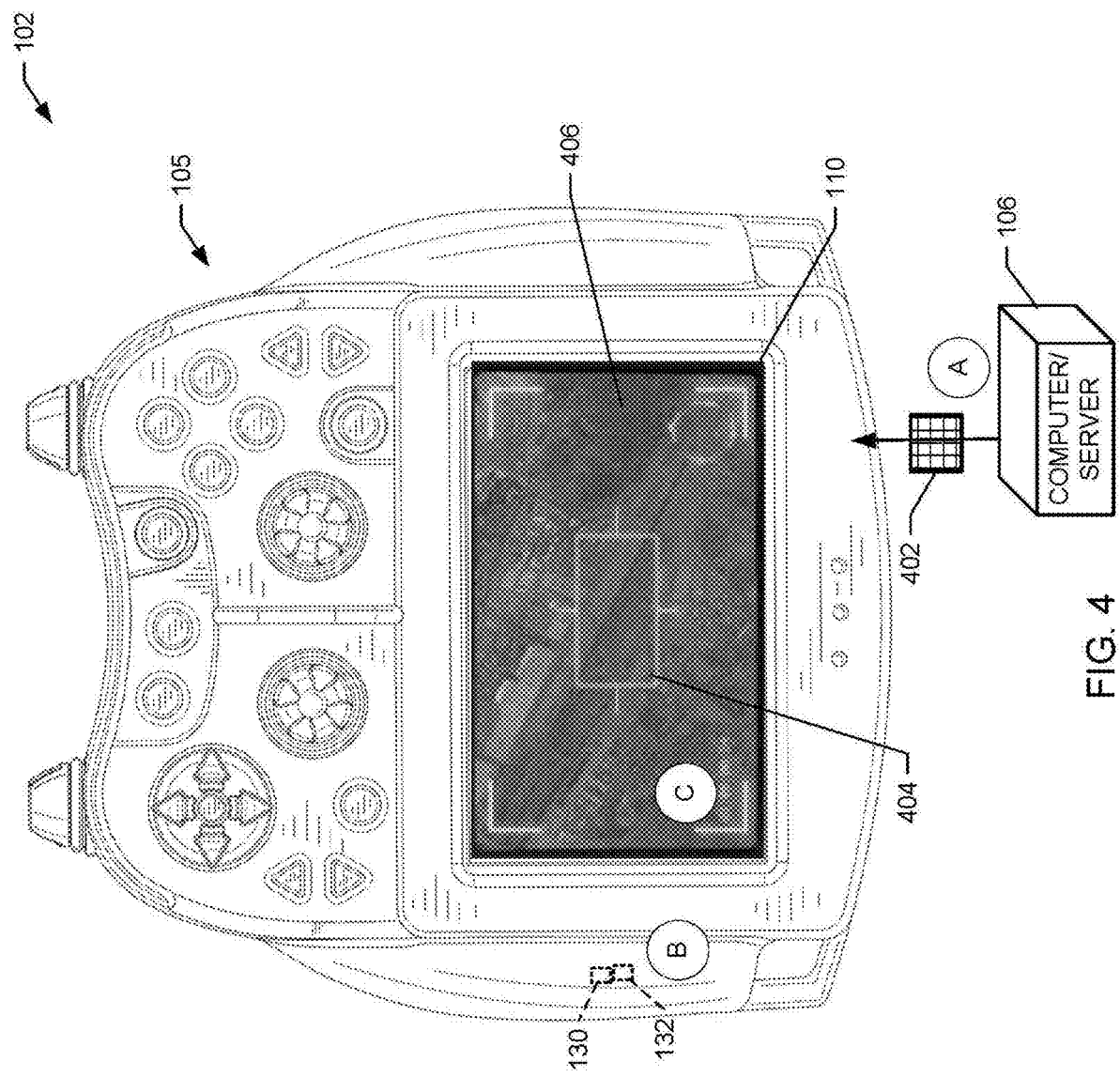
FIG. 4 shows an example process for displaying one or more graphic elements on the remote control of FIGS. 1A, 1B, 2, and 3, according to an example embodiment of the present disclosure.

FIG. 4 shows an example process for displaying one or more graphic elements on the remote control 102 of FIGS. 1 to 3, according to an example embodiment of the present disclosure. In the illustrated example, at Event A, the host computer 106 transmits a command message 402 to the remote control 102. The command message 402 includes an identifier for a wireframe file that shows a target area. A graphic element 404 specified by the wireframe file is shown. The command message 402 may also specify a location where the graphic element 404 is to be displayed, and any display parameters that are to be changed. After receiving the command message 402, at Event B, the management system 130 searches the memory device 132 for the specified wireframe file. The management system 130 then applies the changes to the display parameters specified in command message 402. At Event C, the management system 130 displays the wireframe file 404, as specified by the command message 402. The display parameters may specify, for example, a size of the rectangle, a line color, a line length of the lines extending from the rectangle, a line width, and a location on the display screen 110.

It should also be appreciated that the host computer 106 is providing a real-time or near real-time video feed from an unmanned vehicle. The video data is streamed to the remote control 102 for display on the display screen 110 as video data 406. The transmission of the command message 402 causes the graphic element 404 to be overlaid on top of the video data 406. The wireframe file may include an attribute, property, or parameter, that when set, causes the graphic element 404 to be displayed over a video image or video data.

Figure 5:
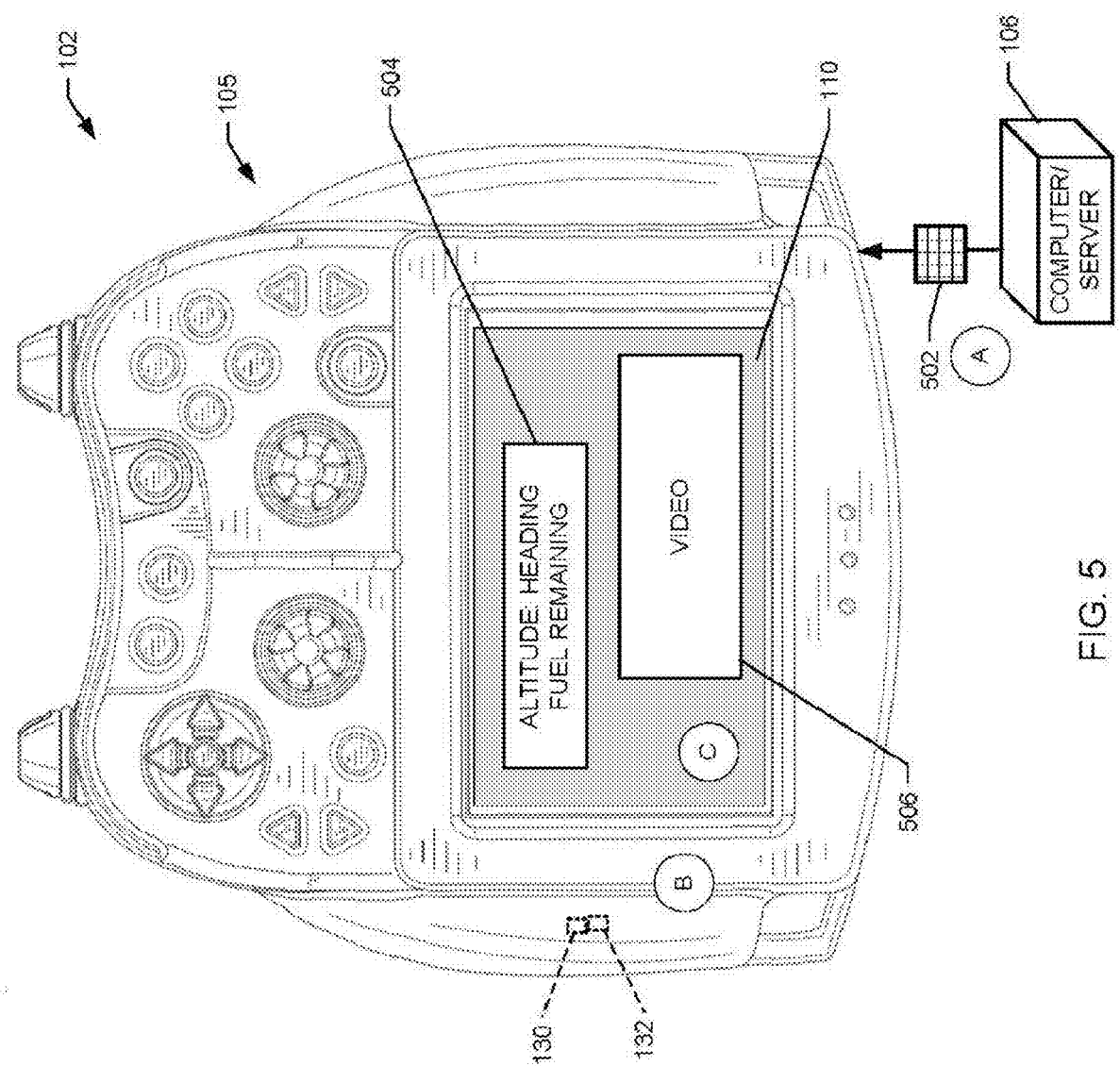
FIGS. 5 and 6 show an example process for displaying, and then changing one or more graphic elements on the remote control of FIGS. 1A, 1B, 2, and 3, according to an example embodiment of the present disclosure.
Figure 6:
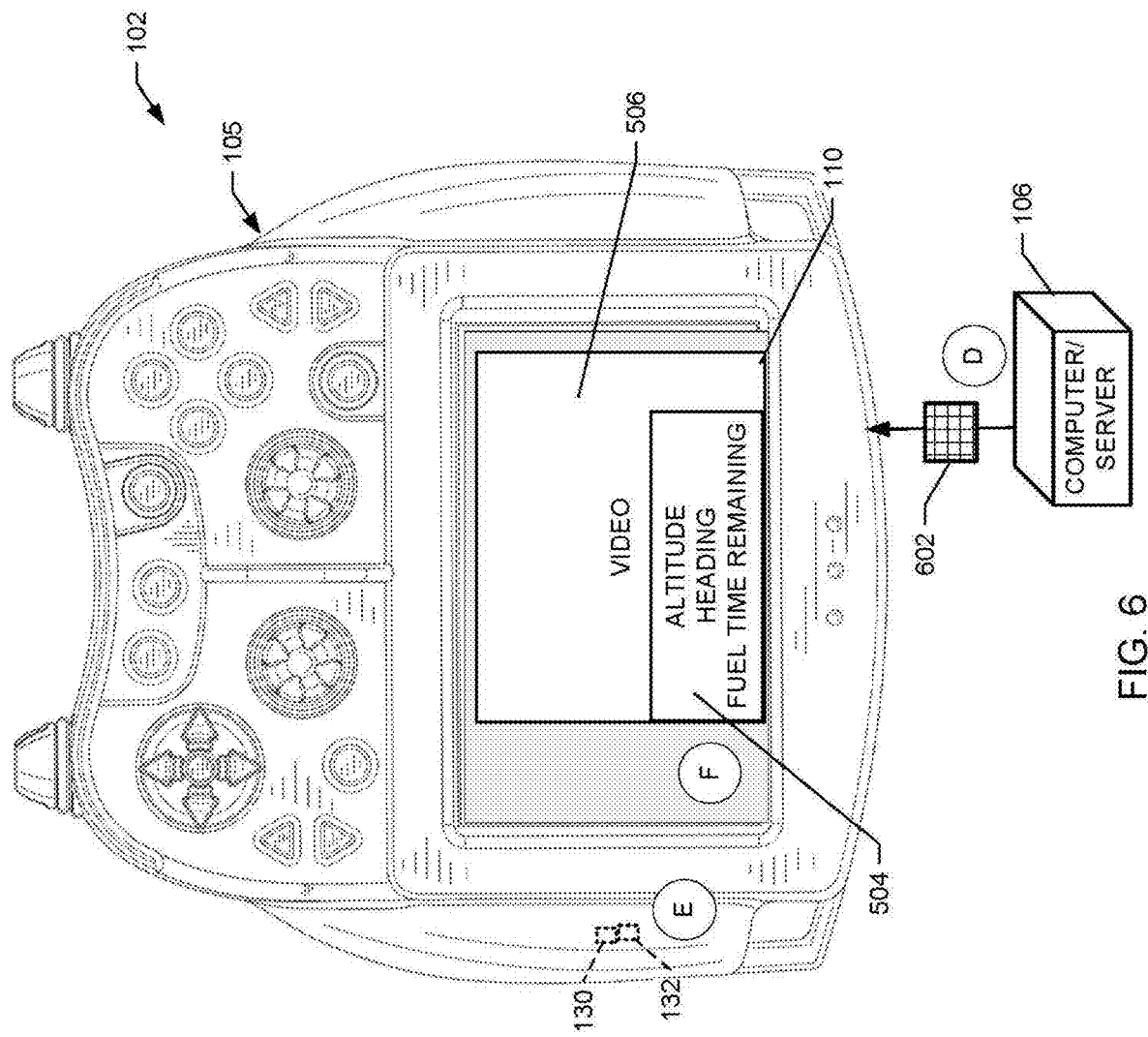

FIGS. 5 and 6 show an example process for displaying, and then changing one or more graphic elements on the remote control 102 of FIGS. 1 to 3, according to an example embodiment of the present disclosure. In the illustrated example, at Event A, the host computer 106 transmits a command message 502 to the remote control 102. The command message 502 identifies a tactical graphic element 504 and a video graphic element 506. In some embodiments, the host computer 106 may transmit separate command messages for the elements 504 and 506. The command message 502 may specify the file name of the tactical graphic element 504, and include feedback data for population into altitude, heading, and fuel remaining fields. The command message 502 also specifies the file name of the video graphic element 506.

At Event B, the management system 130 locates the files in the memory device 132. At Event C, the management system 130 causes the tactical graphic element 504 and the video graphic element 506 to be displayed. The tactical graphic element 504 shows a current altitude, heading, and fuel remaining for an unmanned vehicle. The host computer 106 may send subsequent command messages to update the data in the tactical graphic element 504. For these subsequent messages, the host computer 106 may determine that the tactical graphic element 504 is already displayed and only transmit new data values to update the already displayed data fields. The video graphic element 506 displays a video that was stored in the memory device 132.

As shown in FIG. 6, the host computer 106 transmits another command message 602 at Event D. The message 602 changes the location in which the tactical graphic element 504 is displayed in the display screen 110. The message 602 also changes an order flight data is shown. The message 602 also changes the fuel remaining parameter to a fuel time remaining parameter (which may be calculated by the host computer 106 and/or the unmanned vehicle). Additionally, the message 602 increases a size of the video graphic element 506. In the example, the host computer 106 determines the identified files are already displayed and only transmits commands for changing the display of the flight data. In other embodiments, the host computer 106 transmits commands that indicate or identify the graphic elements for display, and the remote control 102 determines whether the graphic elements are already displayed.

At Event E of FIG. 6, the management system 130 applies the specified changes from the command message 602. At Event F, the management system 130 causes the graphic elements 504 and 506 to be changed as specified by the command message 602. Such a configuration enables an operator at the host computer 106 to change what is displayed on the display screen 110 of the remote control 102 at any time, even during a mission. Further, since only command messages are transmitted, less data is transmitted from the host computer 106, enabling a lower data rate communication link to be used without sacrificing video quality.

It should be appreciated that the host computer 106 can open one or more viewing portals on the display screen 110 of the remote control 102 at any instant and transmit information to each as though it is the only portal on the display screen. The host computer 106 only needs to specify the location and size of each new portal in a command message. No rescaling or resizing of video or graphic elements is required on the part of the host computer 106. Instead, the display management system 130 is configured to handle the reformatting required for display.

Figure 7:
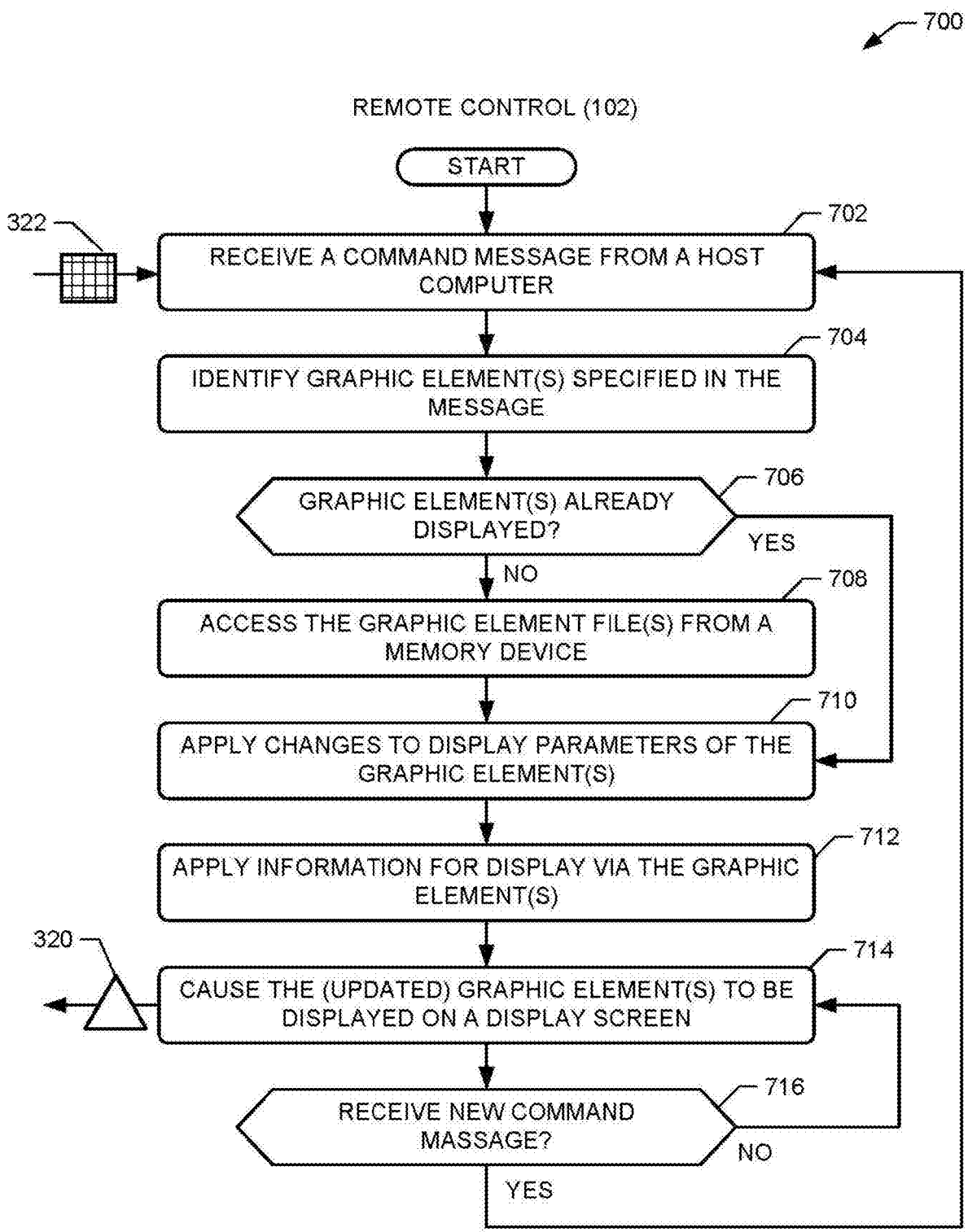
FIG. 7 is a diagram of an example procedure for displaying and/or updating graphic elements on the remote control of FIGS. 1A, 1, and 2 to 6, according to an example embodiment of the present disclosure.

FIG. 7 shows a diagram of an example procedure 700 for displaying and/or updating graphic elements on the remote control 102 of FIGS. 1A, 1, and 2 to 6, according to an example embodiment of the present disclosure. The example remote control 102 is configured to execute or operate machine-readable instructions that are described by the procedure 700. Although the procedure 700 is described with reference to the flow diagram illustrated in FIG. 7, it should be appreciated that many other methods of performing the acts associated with the procedure 700 may be used. For example, the order of many of the blocks may be changed, certain blocks may be combined with other blocks, and many of the blocks described are optional. For example. The procedure 700 may include steps for adding new graphic elements for display from a host computer 106. The procedure 700 may also include steps for determining conditions for changing how a graphic element is displayed based on input received from the control interface 105 and/or a touchscreen of the display screen 110.

The example procedure 700 may be performed before, during, and/or after a mission of an unmanned system 104. For instance, the example procedure 700 may be performed in real time or near-real time as an unmanned system 104 is conducting certain operations during a mission. The example procedure 700 begins when the remote control 102 receives a command message 322 from a host computer 106 (block 702). The command message 322 may be received in at least one API of the remote control 102. The command message 322 identifies at least one graphic element by filename, object name, identifier, metadata, etc. The command message 322 may also specify one or more display parameters or attributes specifying how (and/or whether) the graphic element(s) are to be displayed. The command message 322 may further include information or data that is to be displayed by the graphic element(s). In other instances, the information or data is transmitted by the host computer 106 in separate data messages.

The remote control 102 uses the command message 322 to identify the appropriate graphic element(s) (block 704). The remote control 102 may use the file name, identifier, metadata, etc. in the command message 322 for locating the corresponding graphic element file in the memory device 132. After identifying the graphic element(s), the remote control 102 determines if the graphic element(s) are currently displayed on the display screen (110). If the graphic elements are already displayed, the remote control 102 determines if display parameters are to be updated and/or whether new information/data is to be displayed, as discussed below in connection with blocks 710 and 712.

If the graphic element(s) are not currently displayed, the remote control 102 accesses the corresponding graphic element file(s) from the memory device 132 (block 708). The file(s) include fields for display parameters/attributes/properties of the respective graphic element. The file(s) also include fields and/or variables that accept data values or information for displaying the populated data values or information in connection with the graphic element, such as altitude or position information. The remote control 102 uses information from the command message 322 to update and/or populate display parameters and/or attributes of the graphic element(s) (block 710). As discussed above, the display parameters or attributes specify how the graphic element(s) are to be displayed, including a location for display on the display screen 110, a transparency level, a size/scale, a color, font type, etc. If a graphic element is already displayed, the remote control 102 modifies how it is displayed.

The example remote control 102 also writes, populates, or otherwise includes data values and/or information into fields and/or variables of the graphic element(s) (block 712). For example, the command message 322 may include an altitude value. The command message 322 may include metadata that identifies the value as corresponding to altitude, or include a label or other identifier. In other instances, an API at the remote control 102 identifies data within the command message 322 as corresponding to altitude based on which API field or interface received the data. It should be appreciated that the data values and information may be transmitted separate from and/or in addition to being included within the command message 322. In these instances, data messages may be transmitted when only displayed data is to be updated on the display screen 110. The remote control 102 places the values/information into the appropriate fields/variables of the graphic element(s).

The example procedure 700 continues when the remote control 102 renders or otherwise causes the graphic element(s) to be displayed (shown in FIG. 7 as graphic element 320), as specified by the display parameters/attributes (block 714). The remote control 102 may combine the graph element(s) together for display to provide a layered display. The remote control 102 then determines if another command message is received (block 716). If another command message is received, the procedure 700 returns to block 702 to update a display of the display element(s). This may include removing a graphic element from display. Alternatively, if only a data message received, the procedure 700 returns to block 712 to update which data/information is displayed in connection with the graphic element(s). If a command and/or data message is not received, the procedure 700 continues displaying the current graphic element(s) (block 714). The procedure 700 may end when a session is terminated by an operator.

API Symbol Attribute Hooking Embodiment

In some embodiments, the display management system 130 of the remote control 102 is configured to change an appearance or functionality of a displayed symbol or icon (e.g., a graphic element 320) based on commands from one or more button or switch 105 presses. In these embodiments, the display management system 130 changes how the symbol or icon is displayed based on a definition for the symbol or icon stored in the local memory 132, referred to herein as a display parameter. The display management system 130 is configured to handle or process locally how the symbol or icon changes instead of a remote host computer or server 106. This may be especially beneficial in instances where the host computer 106 does not have graphic processing capabilities.

The change to a symbol or icon (e.g., a graphic element) is specified, as discussed above, by display parameters, properties, or attributes. A developer may define a button set through display parameters that are hooked or otherwise associated with a particular symbol or graphic element. In some instances, the display parameter (or attribute) may define an event message that is transmitted to the host computer 106 when any of the specified buttons in the defined set are pressed. The event message may identify when a button was selected and/or any attribute or parameter values of the hooked symbol or graphic element that are present when selected by the user.

Figure 8:
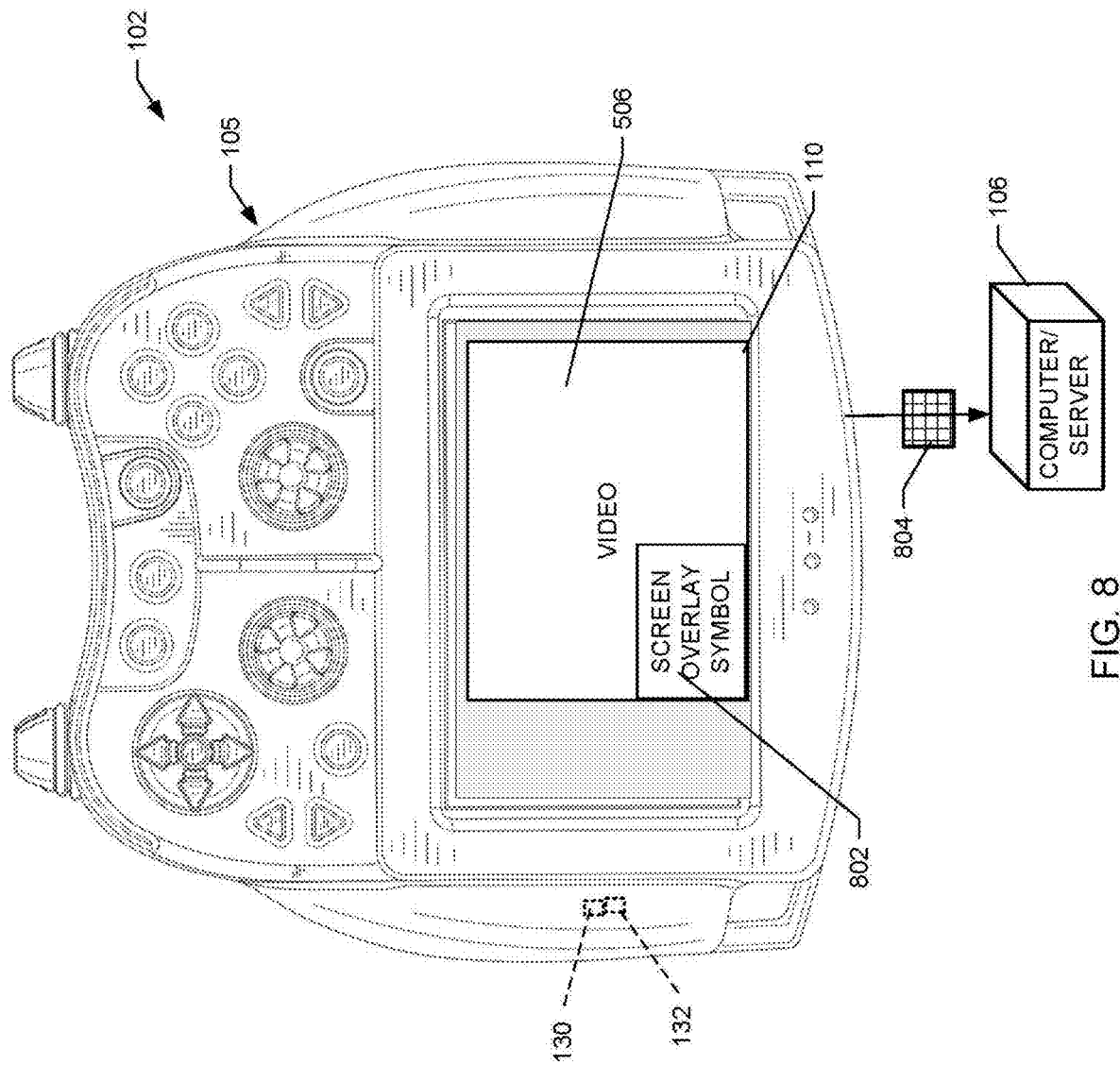
FIGS. 8 and 9 are diagrams illustrating where one or more graphic elements on the remote control of FIGS. 1A, 1B, and 2 to 6 may be moved or changed in appearance using commands from one or more button or switch presses, according to example embodiments of the present disclosure.

FIG. 8 shows an example where a graphic element overlay 802 is provided on top of video images 506 via the display management system 130 of the remote control 102, according to an example embodiment of the present disclosure. The graphic element 802 may include a symbol or other icon that is specified by one or more display parameters that are stored in the local memory 132 (and specified by a developer). In this example, one of the display parameters is linked or hooked to a joystick or one or more buttons or switches 105. The display parameter specifies, for example, that when the graphic element 802 is displayed or selected by a user, movement of the specified joystick causes the graphic element 802 to move in a corresponding manner with respect to the video image 508. In this example, movement from the joystick is detected by the display management system 130, which then uses the display parameter to translate the joystick movement into movement for the graphic element 802.

In addition to physically moving the graphic element 802, a display attribute (or parameter) of the graphic element 802 is also updated. The display attribute specifies a display location for the graphic element 802 with respect to the image 508, such as coordinates. As the graphic element 802 is moved by the display management system 130, the display management system 130 also updates the location attribute/parameter with the new location. In some instances, a selection made by a graphic element 802 causes only related information 804 to be transmitted to the host computer 106. As such, the host computer 106 only has to process the information 804 rather than processing information that is related to movement of the graphic element 802, which is instead performed locally by the display management system 130.

Figure 9:
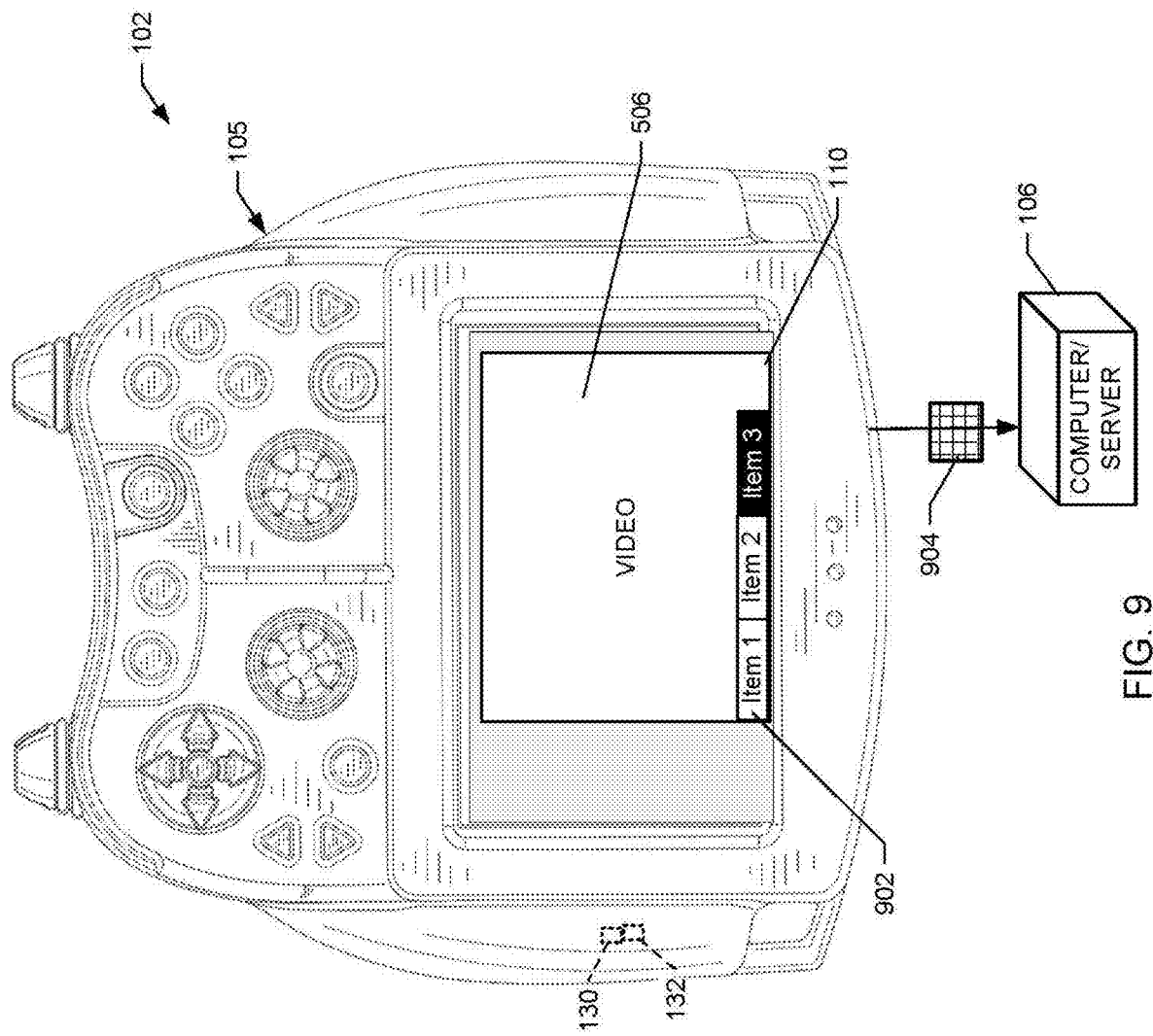

FIG. 9 is another diagram where a graphic element overlay 902 is provided on top of video images 506 via the display management system 130. In this example, the graphic element 902 includes a menu with three items. The graphic element 902 has a selection display parameter linked or hooked to a joystick 105 regarding an update rate. Further, a selection display parameter is linked or hooked to a specified button. In the example, as an operator moves the joystick along a preselected joystick axis, the symbols (e.g., Items) in the menu are highlighted in sequence by the display management system 130. The movement may be based on a changing index value (associated with the display parameter) that increments or decrements depending upon the direction of the joystick movement.

When the operator presses the button 105 to indicate their choice of an option, the display management system 130 transmits an API event message 904 to the host computer 106 indicating that a selection event has occurred. The message 904 also indicates which Item (Item 1, Item 2, or Item 3) was selected. Based on the selected Item, the host computer 106 performs a corresponding operation. In this example, the host computer 106 only responded to the selected operation rather than managing how a display of the graphic element 902 changes based on joystick movement, or processing a selection index. This configuration reduces graphical processing requirements for the host computer 106. In other words, the symbol attribute or parameter of the graphic element 902 is updated in near-real time locally by the display management system 130 rather than the host computer 106.

In another example, a developer may define display parameters for a text box graphic element, in which the text box shows a numeric value. The developer may hook or link the value shown by the text box to a joystick, and define in the display parameter an update rate and selection button. After an operator selects the text box on the display screen 110 of the remote control 102, the operator moves the joystick (of the control interface 105) along a preselected joystick axis. This movement causes the display management system 130 to increment or decrement the value in the text box based upon the direction of the joystick movement so that the contents of textbox update automatically. When the operator presses the button to indicate their intent to capture the value choice shown in the text box (selects the displayed value), the display management system 130 transmits an API event message to the host computer 106. The API event message indicates that an event occurred and includes the current value of the text box graphic element. In some events, the selected value may be displayed on the display screen 110. Additionally or alternatively, a selected value may be used for selecting another graphic element for display.

In yet another example, a developer may define display parameters for a graphic element or symbol that resembles an arrowhead. Further, a display parameter of the graphic element is hooked or associated with screen coordinates of the display screen, where stored screen coordinates represent a location of the arrowhead on the screen. Further, the axes of the coordinate system are linked to axes of a selected joystick of the control interface 105. The display parameter may also specify a transfer function that relates joystick coordinates to screen coordinates and/or defines a button group that signals one or more events that correspond to a set of operations to perform when selected at a given set of coordinates.

In this example, an operator may move a cursor symbol on the display screen 110 using the joystick, with no assistance needed from the host computer 106. The operator then presses a specified button of the control interface 105 that serves as a selector key. The display management system 130 outputs or transmits an API event message in response to the button press. The host computer 106 receives the message indicative of the button press event, and reads the reported screen coordinate position of the symbol (cursor) on the display screen 110 of the remote control 102. The host computer 106 may correlate the cursor screen position to an on-screen object or symbol and determine, based upon the button press, which operation to perform. In other embodiments, the display management system 130 may correlate the cursor screen position to an on-screen graphic element for determining a related operation. The display management system 130 may then transmit a message to the host computer 106 that is indicative as to which operation to perform.

In another example, a developer may define display parameters for a graphic element that specify a crosshair symbol. Further, a display parameter of the graphic element is hooked or associated with screen coordinates of a reticle and corresponding axes of a joystick of the control interface 105. The display management system 130 stores a transfer function for the display parameter that relates joystick coordinates to screen coordinates and defines a button group that signals one or more events that correspond to, for example, a set of operations to perform (e.g. a FIRE command). During use, an operator moves the reticle within the overlay window to designate an aiming point using the joystick of the control interface 105. Simultaneously, without having to update the reticle's corresponding screen position, the display management system 130 transmits messages to the host computer 106 including coordinates. The host computer 106 uses the coordinates to determine azimuth and elevation parameters for aiming a weapon or unmanned system. The display management system 130 may transmit in the message the raw joystick coordinates or the reticle's corresponding screen position. Alternatively, the display parameter may relate the raw joystick coordinates or the reticle's corresponding screen position to azimuth and elevation parameters. These azimuth and elevation parameters may then be transmitted in the message from the display management system 130. In this instance, the weapon (or unmanned system) is moved as the operator moves the joystick.

Alternatively, the display management system 130 may not transmit coordinates until an operator presses the designated FTRE button. In this example, after the button is pressed, the display management system 130 transmits the raw joystick coordinates or the reticle's corresponding screen position in a message to the host computer 106 for setting the weapon azimuth and elevation of the weapon before firing.

API Video Screen Embodiment

In an example embodiment, the display management system 130 is configured to provide a screenshot of an image of the display screen 110. The host computer 106 transmits, for example, an API request message to the display management system 130 for capturing a screenshot. The host computer 106 may transmit the API request message for certain commands that may require later auditing or review, such as firing a weapon.

In the example of FIG. 8, after receiving the request message, the display management system 130 records an image of the video 506 that is displayed. The display management system 130 also captures an image of the graphic element 802. The display management system 130 stores image files to the local memory 132, which may be used for logging purposes, development of training modules, recording evidence of conditions recorded by cameras for later reference (with full screen annotation and context for support).

API Video Rebroadcast Embodiment

In some embodiments, the display management system 130 of the remote control 102 is configured to transmit video contents over a network. The video data may be transmitted in a digital format, such as H.264, motion jpeg, etc. Such a configuration enables a composite video feed that is connected to remote control 102 to be relayed to another viewing device, such as a second remote control 102.

Figure 10:
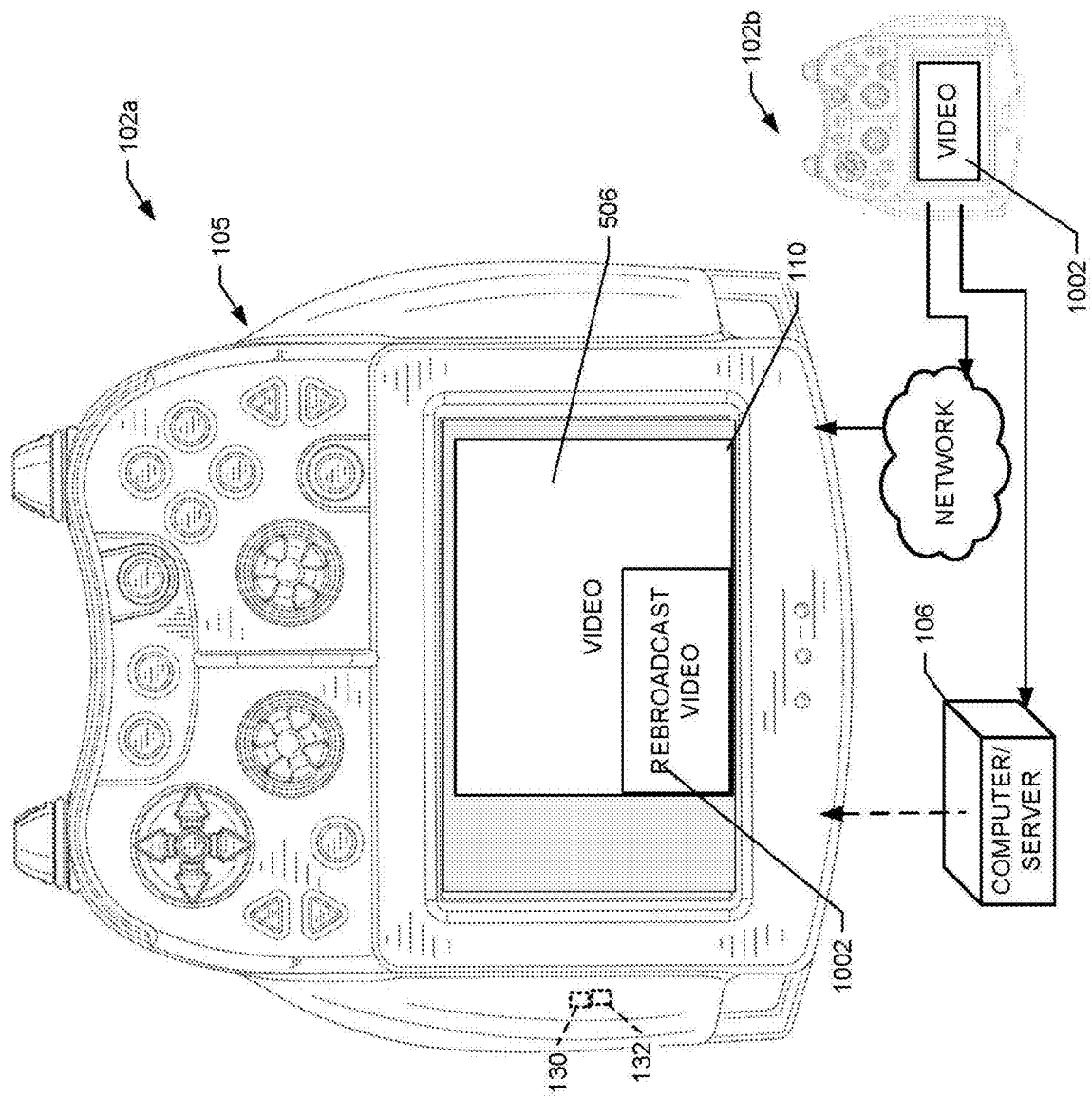
FIG. 10 is a diagram that shows a rebroadcast of video data between remote controls, according to an example embodiment of the present disclosure.

In some embodiments, the host computer 106 is configured to rebroadcast or otherwise make the video from one remote control 102 available to other remote controls 102 or display devices. FIG. 10 is a diagram that shows a rebroadcast of video data between remote controls, according to an example embodiment of the present disclosure. In the illustrated embodiment, a remote control 102b is receiving and displaying video 1002 from a composite feed. Additionally, the display management system 130 of the remote control 102b transmits the video data. The video data is shown as being transmitted to the host computer 106. Additionally or alternatively, the remote control 102b transmits the video data to a network where it is rebroadcast to other remote controls, such as the remote control 102a.

In some instances, the example host computer 106 is configured to make the video data available to other remote controls 102. In addition to remote controls 102, the video data may be rebroadcast on other display devices to provide a composite view of multiple controllers.

An operator of the remote control 102a uses an API (and corresponding configuration options) to cause the display management system 130 to request the video data 1002. In an example, the host computer 106 may first transmit a graphic display containing a list of available video data or feeds. The graphic display may specify parameters for using joystick controls and/or buttons for navigating the menu, as discussed above in connection with FIGS. 8 and 9. Selection of a video feed causes the remote control 102a to process and display the selected video feed. Selection may also cause network elements to route the selected rebroadcast video feed to the requesting remote control 102a. In some instances, a request or event message is transmitted to the host computer 106 from the remote control 102a. In response, the host computer 106 transmits the video data 1002 for concurrent viewing on the remote control 102a.

In some instances, the video data 1002 is provided as a video graphic element with display parameters. From the available parameters, an operator may specify whether the remote video data 1002 or a local composite video feed 506 are to be displayed on the display screen 110. In some instances, the display parameters for the video data 1002 may enable an operator to select which video data 506 or 1002 is to be displayed in a main screen and which is to be displayed in a smaller overlay or pop-up window, as shown in FIG. 10. The display management system 130 and host computer 106 accordingly enable a single remote control 102a to display concurrently any other video feed of related remote controls.

In an example, a team of robotic firefighting robots are equipped with fire suppression equipment and thermal imaging cameras while being deployed at the scene of a fire. The team is able to coordinate its firefighting tactics with video imagery from a number of perspectives, with the video imagery available for display on all of the remote controls 102. This enables the team to decide in real time the most efficient use of its suppression equipment. Each team member could view their own, directly-connected thermal camera imagery in one video portal and the video imagery of any other networked remote control 102 in one or more additional video portals, simultaneously. The situational awareness of all team members is thereby enhanced.

In some instances, in addition to the video data, the display management system 130 may also provide graphic overlays or graphic elements. This configuration enables other operators to not only see the video data, but relevant graphic data that relates to the video. This data may include a crosshair, orientation information, a map or position indicator, etc. In these examples, the accompanying graphic elements are transmitted to the host computer 106 and made available as graphic elements for display in conjunction with the video data, as discussed above. The graphic elements in alternative embodiments may be rebroadcast as screenshots of a target remote control 102.

CONCLUSION

It will be appreciated that each of the systems, structures, methods and procedures described herein may be implemented using one or more computer programs or components. These programs and components may be provided as a series of computer instructions on any conventional computer-readable medium, including random access memory ("RAM"), read only memory ("ROM"), flash memory, magnetic or optical disks, optical memory, or other storage media, and combinations and derivatives thereof. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112(f) or pre-AIA 35 U.S.C. 112, paragraph 6 is not intended to be invoked unless the terms "means" or "step" are explicitly recited in the claims. Accordingly, the claims are not meant to be limited to the corresponding structure, material, or actions described in the specification or equivalents thereof.

The invention is claimed as follows:

1. A remote control apparatus for unmanned systems comprising:
   a display screen for displaying graphic elements;
   a memory device storing a file for a graphic element and display parameters for displaying the graphic element;
   a communication interface including an application programming interface ("API") communicatively coupled to the memory device that enable a host computer to (i) store the graphic element to the memory device, (ii) specify the display parameters and values for the display parameters, and (iii) cause the graphic element to be displayed; and
   a processor configured to:
      receive a command message from the host computer via the API, the command message including at least one parameter value;
      determine the command message is related to the graphic element stored in the memory device; and
      cause the graphic element to be displayed on the display screen by applying the at least one parameter value to the display parameters.

2. The apparatus of claim 1, wherein the processor is configured to:
   receive a second command message from the host computer via the API, the second command message including at least one location parameter value to change a display location of the graphic element;
   determine the second command message is related to the graphic element stored in the memory device; and
   cause the graphic element to be displayed on the display screen at the specified display location by applying the at least one location parameter value to the display parameters.

3. The apparatus of claim 1, wherein the processor is configured to:
   receive a second command message from the host computer via the API, the second command message including a data value for a specified display parameter for display within the graphic element;
   determine the second command message is related to the graphic element stored in the memory device; and
   cause the graphic element to be displayed on the display screen with the data value using the specified display parameter.

4. The apparatus of claim 1, wherein the processor is configured to:
   receive a video stream from the host computer via the API;
   cause the video stream to be displayed on the display screen; and
   cause the graphic element to be overlaid on the display of the video stream.

5. The apparatus of claim 4, wherein the video stream is received in the host computer from at least one camera of an unmanned system.

6. The apparatus of claim 5, wherein the unmanned system includes at least one of an unmanned aerial vehicle ("UAV"), unmanned underwater vehicle ("UUV"), an unmanned surface vehicle ("USV"), or an unmanned ground vehicle ("UGV"), a remote camera system, a safety/first responder system, or industrial equipment.

7. The apparatus of claim 1, wherein the communication interface is communicatively coupled to the host computer via at least one of a serial connection, an Ethernet connection, a Bluetooth® connection, a CAN bus connection, or a Zigbee® connection.

8. The apparatus of claim 1, further comprising a control interface including at least one of toggle controls, multi-axis hall-effect joystick controls, push buttons, or up/down push buttons.

9. The apparatus of claim 8, wherein at least one display parameter of the display parameters includes an association with the control interface such that actuation of a button or a joystick of the control interface causes the processor to move or change a display characteristic of the graphic element.

10. The apparatus of claim 8, wherein the display screen includes at least one of a touch screen or a multi-function display ("MFD"), and
wherein the touch screen is part of the control interface.

11. The apparatus of claim 1, wherein the graphic element provides for display of at least one of:
video related to an unmanned system in communication with the host computer,
position, sensor, aspect, diagnostic, or status information related to an unmanned system in communication with the host computer,
information related to related to an unmanned system that is determined by the host computer,
a template, reticle, or wireframe for displaying information related to an unmanned system in communication with the host computer, or
an icon or symbol related to operation of an unmanned system in communication with the host computer.

12. The apparatus of claim 1, wherein the processor is configured to receive the command message from the host computer at least one of before or during a mission performed by an unmanned system.

13. The apparatus of claim 1, wherein the processor is configured to:
receive, via the API from the host computer, a screenshot request message;
record an image of contents displayed by the display screen including the graphic element; and
store the image to the memory device.

14. A remote control method for unmanned systems comprising:
receiving, in an application programming interface ("API") of a remote control, a command message from a host computer, the command message identifying a graphic element and including at least one parameter value;
determining, via a processor of the remote control, that a memory device of the remote control includes a graphic element file corresponding to the graphic element specified in the command message;
applying, via the processor, the at least one parameter value to a corresponding display parameter of the graphic element file; and causing, via the processor, the graphic element to be displayed on a display screen of the remote control such that the graphic element is displayed as specified by the at least one parameter value.

15. The method of claim 14, further comprising:
receiving, in the API, before the command message, a graphic element message including the graphic element file from the host computer; and
storing, via the processor, the graphic element to the memory device of the remote control.

16. The method of claim 14, further comprising:
receiving, via the API, a second command message from the host computer, the second command message including at least one location parameter value to change a display location of the graphic element;
determining, via the processor, the second command message is related to the graphic element stored in the memory device; and
causing, via the processor, the graphic element to be displayed on the display screen at the specified display location by applying the at least one location parameter value to the display parameter.

17. The method of claim 14, further comprising:
receiving, via the API, a second command message from the host computer, the second command message including a data value for a specified display parameter for display within the graphic element;
determining, via the processor, the second command message is related to the graphic element stored in the memory device; and
causing, via the processor, the graphic element to be displayed on the display screen with the data value using the specified display parameter.

18. The method of claim 14, further comprising:
receiving, via a control interface, a request message that is indicative of a request to view available video feeds of other remote controls;
identifying, via the processor, available video feeds from other remote controls;
causing, via the processor, a list of the identified video feeds to be displayed on the display screen;
receiving, via the control interface, a selection of a video feed from the list; and
causing, via the processor, the selected video feed to be displayed in addition to the graphic element.

19. The method of claim 18, wherein identifying the available data feeds includes transmitting, from the processor, a first request to a network, connected remote controls, or the host computer for a list or indication of the available video feeds, and
wherein causing the selected video feed to be displayed includes transmitting, from the processor, a second request to the network, the connected remote controls, or the host computer, for the selected video feed causing the selected video feed to be routed or transmitted to the API or the processor of the remote control.

20. The method of claim 14, wherein the display parameter includes an association with a control interface of the remote control, the method further comprising:
receiving, in the processor, a signal indicative of actuation of a button or a joystick of the control interface;
determining, via the processor, the signal into a movement change or display change of the display parameter;
updating, via the processor, the at least one parameter value using the determined movement change or display change; and causing, via the processor, the graphic element to be displayed on the display screen of the remote control such that the graphic element is displayed as specified by the updated at least one parameter value.

\* \* \* \* \*